(12) United States Patent
Ikari (10) Patent No.: US 7,974,756 B2
(45) Date of Patent: Jul. 5, 2011

(54) CONSTRUCTION VEHICLE

(75) Inventor: Masanori Ikari, Komatsu (JP)

(73) Assignee: Komatsu Ltd., Tokyo (JP)

( * ) Notice: Subject to any disclaimer, the term of this patent is extended or adjusted under 35 U.S.C. 154(b) by 530 days.

(21) Appl. No.: 12/091,524

(22) PCT Filed: Dec. 1, 2006

(86) PCT No.: PCT/JP2006/324085
§ 371 (c)(1),
(2), (4) Date: Apr. 25, 2008

(87) PCT Pub. No.: WO2007/074608
PCT Pub. Date: Jul. 5, 2007

(65) Prior Publication Data
US 2009/0265065 A1    Oct. 22, 2009

(30) Foreign Application Priority Data
Dec. 26, 2005   (JP) .................... 2005-373075

(51) Int. Cl.
*G06F 19/00* (2006.01)
*F02D 29/02* (2006.01)
(52) U.S. Cl. .......... 701/50; 180/197; 180/19.3; 180/307
(58) Field of Classification Search ........ 701/50, 701/82, 84, 90, 36; 180/305, 302, 19.1–19.3, 180/197, 307
See application file for complete search history.

(56) References Cited

U.S. PATENT DOCUMENTS

| 4,836,616 | A | * | 6/1989 | Roper et al. | 303/122.06 |
| 4,985,838 | A | * | 1/1991 | Hashiguchi et al. | 701/90 |
| 5,630,317 | A | * | 5/1997 | Takamura et al. | 60/445 |
| 5,765,657 | A | * | 6/1998 | Fukumura et al. | 180/197 |
| 6,438,506 | B1 | * | 8/2002 | Yohpe et al. | 702/145 |
| 7,240,489 | B2 | | 7/2007 | Hofer | |
| 7,588,118 | B2 | * | 9/2009 | Sawada | 180/302 |
| 2004/0211614 | A1 | | 10/2004 | Matsuyama | |

FOREIGN PATENT DOCUMENTS

| DE | 10 2004 016 242 A1 | 10/2005 |
| JP | 03-050034 A | 3/1991 |
| JP | 04-203430 A | 7/1992 |
| JP | 05-099012 A | 4/1993 |
| JP | 2004-144254 A | 5/2004 |
| RU | 2 074 290 C1 | 2/1997 |

* cited by examiner

*Primary Examiner* — Thomas G Black
*Assistant Examiner* — Marthe Marc Coleman
(74) *Attorney, Agent, or Firm* — Global IP Counselors (57) ABSTRACT

A construction vehicle includes an engine, a hydraulic pump configured to be driven by the engine, a traveling hydraulic motor configured to be driven by pressured oil discharged by the hydraulic pump, a traveling wheel configured to be driven by driving force of the traveling hydraulic motor, and a control unit configured to control a vehicle velocity and a traction force by controlling rotation speed of the engine, capacity of the hydraulic pump, and capacity of the traveling hydraulic motor. In addition, the control unit is further configured to perform slip reduction control for reducing the maximum rotation speed of the engine as the vehicle velocity becomes slow in a low-velocity range in which the vehicle velocity is less than or equal to a predetermined velocity.

9 Claims, 7 Drawing Sheets

| VEHICLE VELOCITY (km/h) | 0.5 | 1.0 | 2.0 | 4.0 | 6.0 | 8.0 |
|---|---|---|---|---|---|---|
| MAXIMUM THROTTLE OPENING DEGREE (%) | E | D | C | B | A | A |

CONSTRUCTION VEHICLE

CROSS-REFERENCE TO RELATED APPLICATIONS

This U.S. National stage application claims priority under 35 U.S.C. §119(a) to Japanese Patent Application No. 2005-373075, filed in Japan on Dec. 26, 2005. The entire contents of Japanese Patent Application No. 2005-373075 are hereby incorporated herein by reference.

TECHNICAL FIELD

Present invention relates to a construction vehicle.

BACKGROUND ART

Some construction vehicles are configured to travel when a hydraulic pump is driven by an engine and a traveling hydraulic motor is driven by pressured oil discharged from the hydraulic pump. In this type of construction vehicle, it is possible to control vehicle velocity and traction force by controlling rotation speed of the engine, capacity of the hydraulic pump, and capacity of the traveling hydraulic motor (Japanese Patent Application Publication No. JP-A-2004-144254).

SUMMARY OF THE INVENTION

Figure 9:
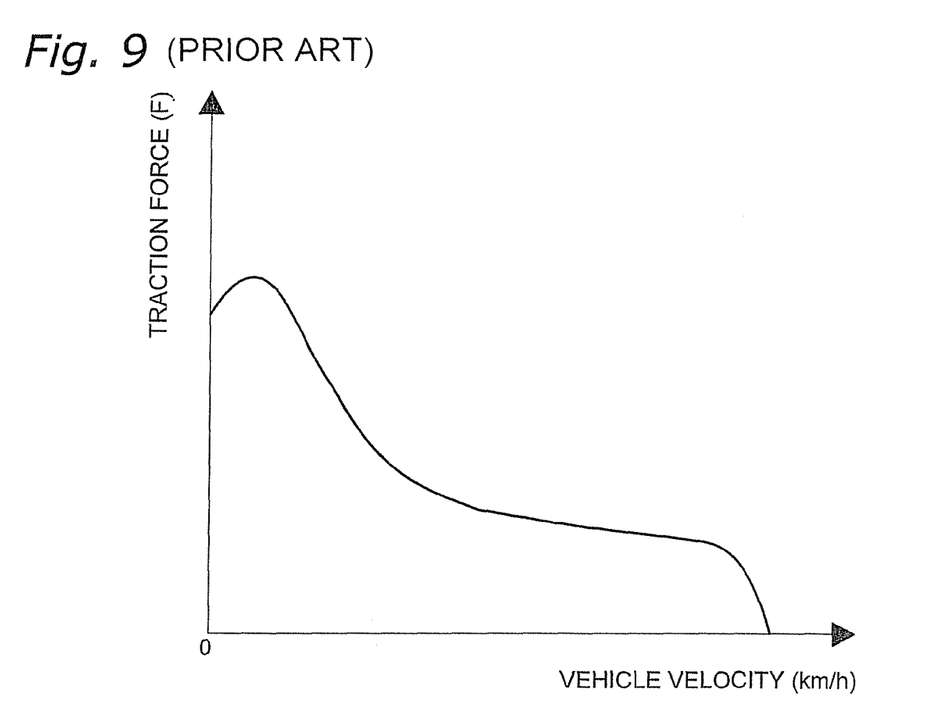
FIG. 9 is a chart for illustrating the vehicle velocity-traction force property of a conventional construction vehicle.

In the above described construction vehicle, the vehicle velocity-traction force property is achieved as illustrated in FIG. 9. Note that in the figure, the horizontal axis is vehicle velocity, and the vertical axis is traction force. As indicated in this vehicle velocity-traction force property, the peak of the traction force is generated not when the vehicle velocity is zero but when the vehicle velocity is within a low-velocity range. Accordingly, the traction force is maximized during an operation at low-velocity in such a case that excavation is performed on the low-friction road such as the soft road and the road covered with snow. Thus, the traveling wheels easily go into a skid.

An object of the present invention is to provide a construction vehicle that is capable of reducing occurrence of slip.

A construction vehicle of a first aspect of the invention includes an engine, a hydraulic pump configured to be driven by the engine, a traveling hydraulic motor configured to be driven by pressured oil discharged from the hydraulic pump, a traveling wheel configured to be driven by driving force of the traveling hydraulic motor, a control unit configured to control a vehicle velocity and a traction force by controlling rotation speed of the engine, capacity of the hydraulic pump, and capacity of the traveling hydraulic motor, and a vehicle velocity detection unit configured to detect the vehicle velocity. In addition, the control unit is further configured to perform slip reduction control for reducing the maximum rotation speed of the engine as the vehicle velocity becomes slow in a low-velocity range in which the vehicle velocity is less than or equal to a predetermined velocity.

In this construction vehicle, the maximum rotation speed of the engine is controlled to be reduced as the vehicle velocity becomes slow under the slip reduction control. Accordingly, it is possible to achieve the vehicle velocity-traction force property that is approximated to a vehicle velocity-traction force property of a vehicle that a torque converter is installed therein. The vehicle that a torque converter is installed therein has the vehicle velocity-traction force property in which the traction force is maximized when the vehicle velocity is zero. Therefore, it is possible to prevent the vehicle from easily slipping even during an operation on the low-friction road by achieving the vehicle velocity-traction force property that is approximated to this. Accordingly, it is possible to reduce occurrence of slip in this construction vehicle.

A construction vehicle of the second aspect of the invention includes an engine, a hydraulic pump configured to be driven by the engine, a traveling hydraulic motor configured to be driven by pressured oil to be discharged from the hydraulic pump, a traveling wheel configured to be driven by driving force of the traveling hydraulic motor, and a control unit configured to control a vehicle velocity and a traction force by controlling rotation speed of the engine, capacity of the hydraulic pump, and capacity of the traveling hydraulic motor. In addition, the control unit is further configured to perform slip reduction control for reducing the maximum rotation speed of the engine such that a vehicle velocity-traction force property is approximated to a vehicle velocity-traction force property of a vehicle having a torque converter.

In this construction vehicle, the maximum rotation speed of the engine is controlled under the slip reduction control. Accordingly, it is possible to achieve the vehicle velocity-traction force property that is approximated to the vehicle velocity-traction force property of the vehicle that a torque converter is installed therein. The vehicle that a torque converter is installed therein has the vehicle velocity-traction force property in which the traction force is maximized when the vehicle velocity is zero. Therefore, it is possible to prevent the vehicle from easily slipping even during an operation on the low-friction road by achieving the vehicle velocity-traction force property that is approximated to this. Accordingly, it is possible to reduce occurrence of slip in this construction vehicle.

A construction vehicle of a third aspect of the invention is the construction vehicle of the second aspect of the invention, and the control unit is configured to control the maximum rotation speed of the engine under the slip reduction control such that the vehicle velocity-traction force property is approximated to a monotonically decreasing function.

In this construction vehicle, the maximum rotation speed of the engine is controlled under the slip reduction control. Accordingly, it is possible to achieve the vehicle velocity-traction force property that is approximated to a monotonically decreasing function. Accordingly, the maximum traction force is generated at the vehicle velocity that corresponds to zero or is approximated to zero. Accordingly, it is possible to reduce occurrence of slip in this construction vehicle.

A construction vehicle of a fourth aspect of the invention is the construction vehicle of the first or second aspect of the invention, and the control unit is configured to control the maximum rotation speed of the engine under the slip reduction control such that the maximum traction force in the vehicle velocity-traction force property is generated at a first velocity slower than a second velocity at which the maximum traction force is generated when the slip reduction control is not performed.

In this construction vehicle, the maximum traction force is generated at velocity slower than velocity at which the maximum traction force is generated without performing the slip reduction control. Accordingly, it is possible to further reduce occurrence of slip in this construction vehicle, compared to a case that the maximum rotation speed of the engine is set to be constant.

A construction vehicle of a fifth aspect of the invention is the construction vehicle of the second aspect of the invention, and further includes a vehicle velocity detection unit configured to detect the vehicle velocity. In addition, the control unit is configured to determine the maximum rotation speed of the engine based on the vehicle velocity to be detected under the slip reduction control.

In this construction vehicle, the maximum rotation speed of the engine is determined based on the vehicle velocity to be detected. Accordingly, with a simple control, it is possible to achieve the vehicle velocity-traction force property that is approximated to a vehicle velocity-traction force property of a vehicle that a torque converter is installed therein.

A construction vehicle of a sixth aspect of the invention is the construction vehicle of the fifth aspect of the invention, and the control unit is configured to reduce the maximum rotation speed of the engine under the slip reduction control as the vehicle velocity becomes slow.

In this construction vehicle, under the slip reduction control, the maximum rotation speed of the engine is reduced as the vehicle velocity becomes slower. The maximum rotation speed of the engine is thus controlled under the slip reduction control. Accordingly, it is possible to achieve the vehicle velocity-traction force property that is approximated to a vehicle velocity-traction force property of a vehicle having the torque converter.

A construction vehicle of a seventh aspect of the invention is the construction vehicle of the first or second aspect of the invention, and further includes a slip reduction control selection unit configured to receive an operator input to activate the slip reduction control.

In this construction vehicle, it is possible to arbitrary select performance or non-performance of the slip reduction control when the operator manipulates the slip reduction control selection unit. For example, it is possible to perform the slip reduction control during traveling on the low-friction road, and it is possible to prevent performance of the slip reduction control during traveling on the normal road.

DETAILED DESCRIPTION OF THE PREFERRED EMBODIMENTS

Figure 1:
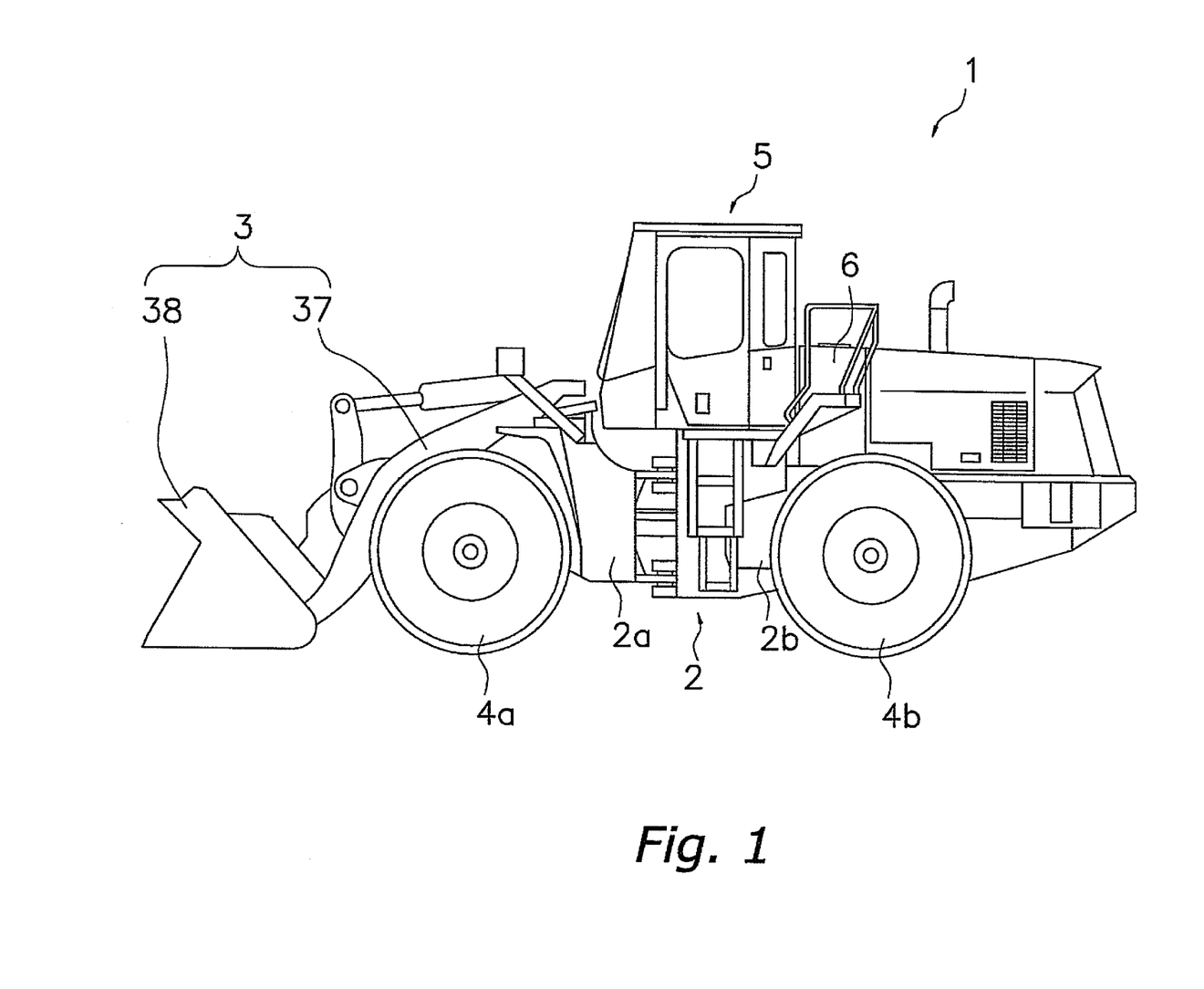
FIG. 1 is a side elevational view of a construction vehicle.

FIG. 1 is a lateral view of a construction vehicle 1 in accordance with an embodiment of the present invention. The construction vehicle 1 is an automotive wheel loader with tires 4a and 4b and is capable of performing a desired operation with an operating machine 3. The construction vehicle 1 includes a vehicle body frame 2, the operating machine 3, the tires 4a and 4b (traveling wheels), and an operator cab 5.

The vehicle body frame 2 includes a front frame 2a that is disposed on the front side thereof, and a rear frame 2b that is disposed on the rear side thereof. The front frame 2a and the rear frame 2b are coupled to each other in the center of the vehicle body frame 2 so as to be capable of pivoting in the right-to-left direction.

The operating machine 3 and a pair of front tires 4a are attached to the front frame 2a. The operating machine 3 is a device that is driven by pressured oil from an operating machine hydraulic pump 11 (see FIG. 2). The operating machine 3 includes a lift arm 37 that is mounted to the front part of the front frame 2a, a bucket 38 that is mounted to the tip of the lift arm 37, and a operating machine cylinder 26 for driving these members (see FIG. 2). The front tires 4a are provided on the lateral surfaces of the front frame 2a.

The rear frame 2b is provided with the operator cab 5, a hydraulic oil tank 6, the pair of rear tires 4b, and the like. The operator cab 5 is mounted on the top of the vehicle body frame 2, and an operating unit such as a handle and an accelerator, a display unit for displaying a variety of information such as velocity, a seat, and the like are provided in the interior of the operator cab 5. The hydraulic oil tank 6 is disposed on the backward of the operator cab 5, and stores hydraulic oil to be pressurized by a variety of hydraulic pumps. The rear tires 4b are provided on the lateral surfaces of the rear frame 2b.

In addition, the hydraulic driving mechanism 7 for driving the tires 4a and 4b and the operating machine 3 are mounted to the vehicle body frame 2. The configuration of the hydraulic driving mechanism 7 will be explained with reference to FIG. 2.

Hydraulic Driving Mechanism 7

Figure 2:
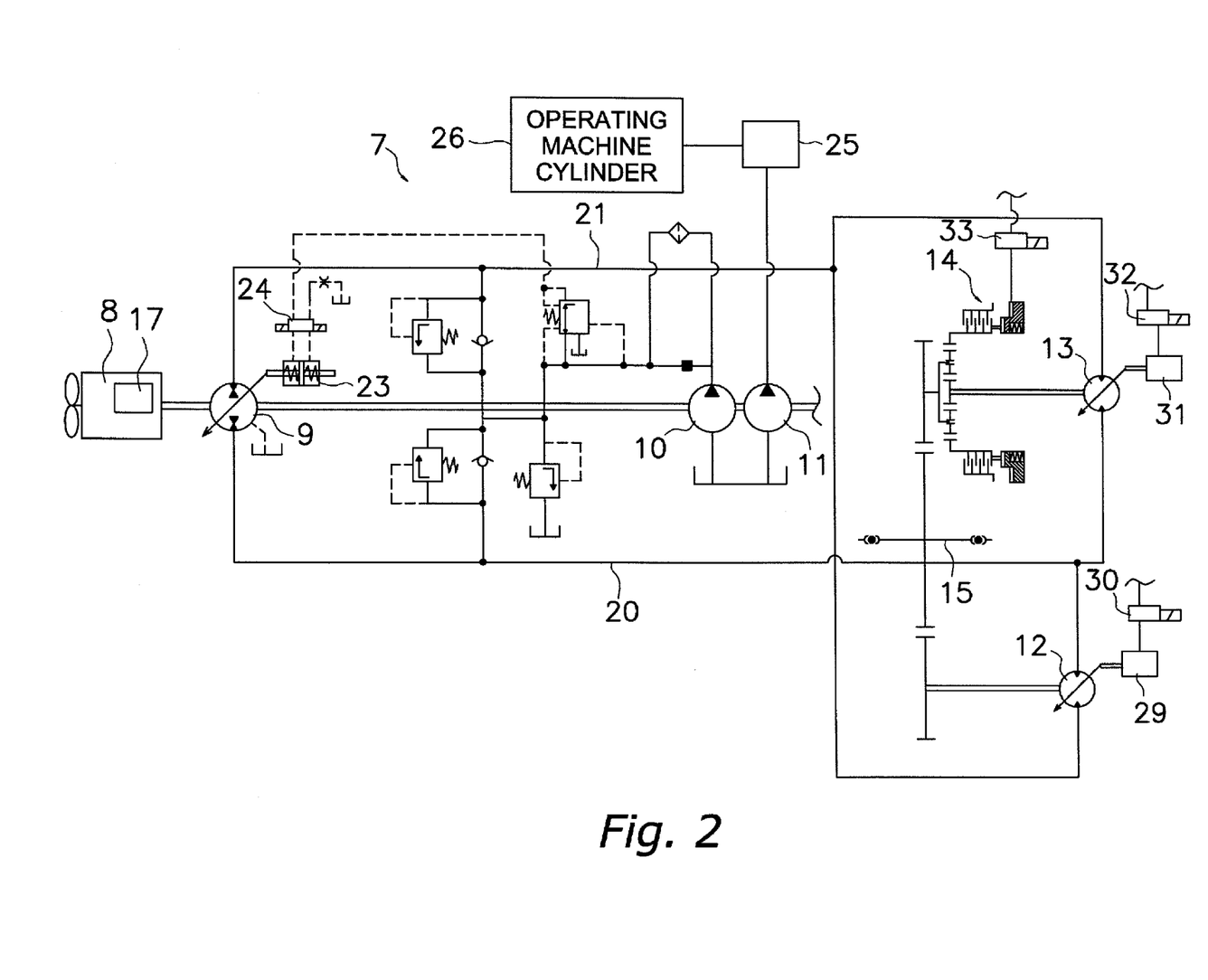
FIG. 2 is a schematic diagram for illustrating a configuration of a hydraulic driving mechanism.

The hydraulic driving mechanism 7 mainly includes an engine 8, a main pump 9 (hydraulic pump), a charging pump 10, the operating machine hydraulic pump 11, a first traveling motor 12, a second traveling motor 13 (traveling hydraulic motor), a clutch 14, a driving shaft 15, and a control unit 16 (see FIG. 3), and a so-called HST (Hydro Static Transmission) system is employed therein.

The engine 8 is a diesel engine, and output torque generated in the engine 8 is transmitted to the main pump 9, the charging pump 10, the operating machine hydraulic pump 11, a steering hydraulic pump (not illustrated in the figure), and the like. A fuel injection device 17 is attached to the engine 8 for controlling output torque and rotation speed of the engine 8. The fuel injection device 17 regulates the throttle opening degree (command value for the rotation speed of the engine) depending on the amount of operating the accelerator (hereinafter called "accelerator opening degree"), and regulates the amount of injecting fuel. The accelerator is means for instructing the target rotation speed of the engine 8, and an accelerator opening degree detection unit 18 (see FIG. 3) is provided with the accelerator. The accelerator opening degree detection unit 18 is made up of a potentiometer and the like, and detects the accelerator opening degree. The accelerator opening degree detection unit 18 transmits an opening degree signal for indicating the accelerator opening degree to the control unit 16, and a control signal is outputted from the control unit 16 to the fuel injection device 17. Accordingly, an operator is allowed to control the rotation speed of the engine 8 by regulating the amount of operating the accelerator. In addition, the engine 8 is provided with an engine rotation speed detection unit 19 (see FIG. 3) that is made up of a rotation sensor for detecting the actual rotation speed of the engine 8. A rotation speed signal outputted from the engine rotation speed detection unit 19 is inputted into the control unit 16.

The main pump 9 is a variable capacity type hydraulic pump that is driven by the engine 8. The pressured oil discharged from the main pump 9 is transmitted to the first traveling motor 12 and the second traveling motor 13 via the main circuits 20 and 21. Note that the hydraulic drive mechanism 7 is provided with a main circuit hydraulic pressure detection unit 22 (see FIG. 3) for detecting the pressure of the pressured oil (hereinafter called "main circuit hydraulic pressure") running through the main circuits 20 and 21. Note that the main circuit hydraulic pressure corresponds to the driving hydraulic pressure of the pressured oil for driving the first traveling motor 12 and the second traveling motor 13. In addition, a pump capacity control cylinder 23 and a pump capacity control valve 24, which serve to control the capacity of the main pump 9, are coupled to the main pump 9. The pump capacity control valve 24 is an electromagnetic control valve for controlling the pump capacity control cylinder 23 based on a control signal from the control unit 16, and is allowed to arbitrary change the capacity of the main pump 9 by controlling the pump capacity control cylinder 23.

The charging pump 10 is driven by the engine 8, and is a pump for providing the pressured oil to the main circuits 20 and 21. In addition, the charging pump 10 provides the pressured oil to a pilot circuit of the main pump 9.

The operating machine hydraulic pump 11 is driven by the engine 8, and the pressured oil discharged from the operation machine hydraulic pump 11 is transmitted to the operating machine cylinder 26 of the operating machine 3 via the operation machine hydraulic pressure circuit 25, and accordingly the operation machine cylinder 26 is driven. Also, the operating machine hydraulic pressure circuit 25 is provided with an operating machine control valve 27 (see FIG. 3) for controlling the operating machine cylinder 26. The operating machine cylinder 26 is controlled when the operating machine control valve 27 is controlled based on a control signal from the control unit 16.

The first traveling motor 12 is a variable capacity type hydraulic motor. The first traveling motor 12 is driven by the pressured oil discharged from the main pump 9, and generates driving force for traveling. The first traveling motor 12 is provided with a first motor cylinder 29 for controlling tilt rotation angle of the first traveling motor 12, and a first motor control valve 30 (see FIG. 3) for controlling the first motor cylinder 29. The first motor control valve 30 is an electromagnetic control valve to be controlled based on a control signal from the control unit 16, and is allowed to arbitrary change the capacity of the first traveling motor 12 by controlling the first motor cylinder 29.

As is the case with the first traveling motor 12, the second traveling motor 13 is a variable capacity type hydraulic motor that is driven by the pressured oil discharged from the main pump 9, and makes the driving shaft 15 to generate driving force for traveling. The second traveling motor 13 is disposed on the hydraulic circuit in parallel with the first traveling motor 12. In addition, the second traveling motor 13 is provided with a second motor cylinder 31 for controlling tilt rotation angle of the second traveling motor 13, and a second motor control valve 32 (see FIG. 3) for controlling the second motor cylinder 31. The second motor control valve 32 is an electromagnetic control valve to be controlled based on a control signal from the control unit 16, and is allowed to arbitrary change the capacity of the second traveling motor 13 by controlling the second motor cylinder 31. In addition, it is possible to regulate the maximum tilt rotation angle and the minimum tilt rotation angle by regulating a control signal to be applied to the second motor control valve 32.

The clutch 14 is a device for switching between transmission and non-transmission of the driving force from the second traveling motor 13 to the driving shaft 15. The clutch 14 is provided with a clutch control valve 33 (see FIG. 3) for switching between engagement and non-engagement of the clutch 14. The clutch control valve 33 is an electromagnetic control valve for switching between engagement and non-engagement of the clutch 14 based on a control signal from the control unit 16. During the low-velocity traveling, the clutch 14 is set to be in an engaged state, and the driving force of the first traveling motor 12 and that of the second traveling motor 13 are transmitted to the driving shaft 15. During the high-velocity traveling, the clutch 14 is set to be in a non-engaged state, and only the driving force of the first traveling motor 12 is transmitted to the driving shaft 15.

The driving shaft 15 transmits the driving force of the first traveling motor 12 and that of the second traveling motor 13 to the tires 4a and 4b. Accordingly, the tires 4a and 4b (see FIG. 1) rotates. In addition, the driving shaft 15 is provided with a vehicle velocity detection unit 34 (see FIG. 3) that is made up of a vehicle velocity sensor for detecting the vehicle velocity based on the rotation speed of the driving shaft 15, and a vehicle velocity signal outputted from the vehicle velocity detection unit 34 is inputted into the control unit 16.

Figure 4:
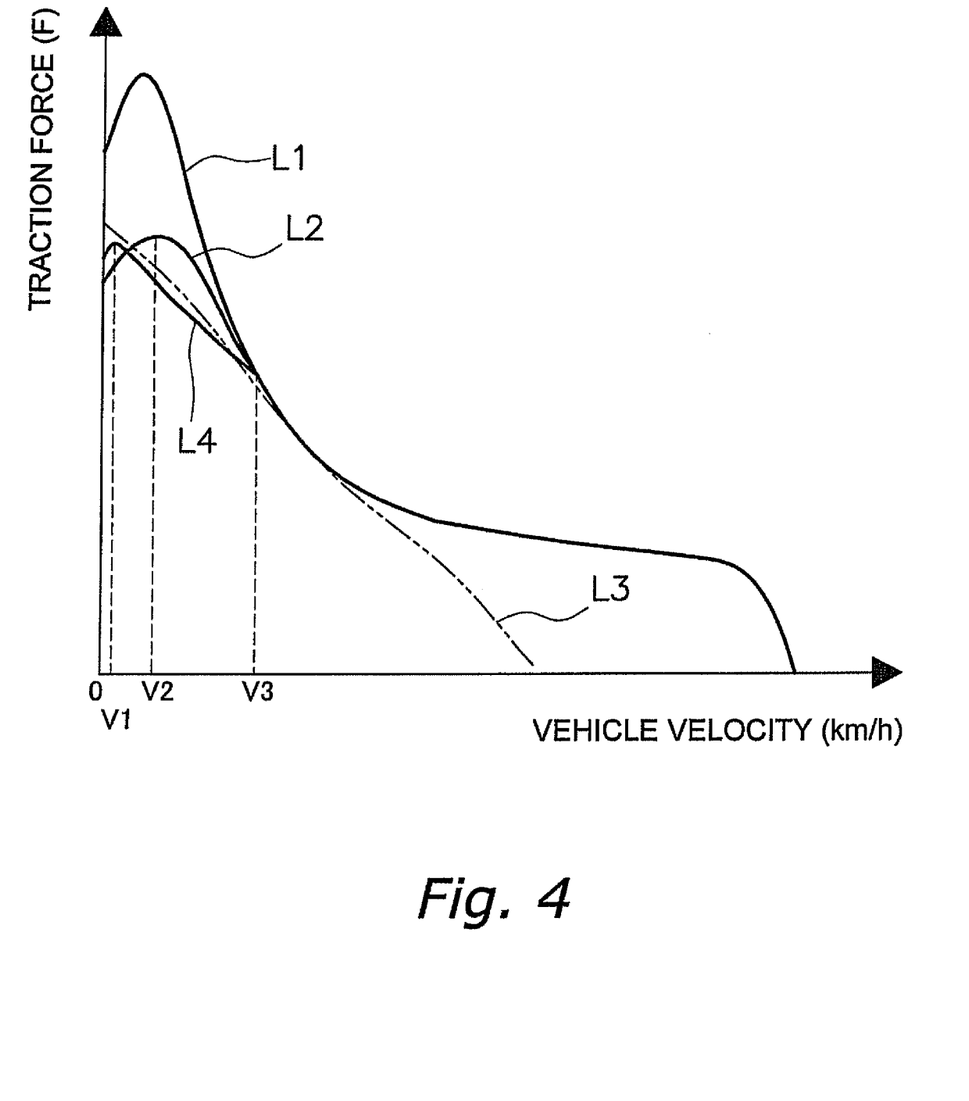
FIG. 4 is a chart for illustrating vehicle velocity-traction force property.

The control unit 16 is allowed to electrically control each of the control valves and the fuel injection device 17 based on an output signal from each of the detection units, and is allowed to control the rotation speed of the engine, the capacity of each of the hydraulic pumps 9-11, the capacity of each of the traveling motors 12 and 13, and the like. Accordingly, as illustrated in FIG. 4, in this construction vehicle 1, it is possible to change the traction force and the vehicle velocity in a non-step form and thus it is possible to automatically change the vehicle velocity without a gearshift operation from the vehicle velocity zero to the maximum vehicle velocity. Control of the traveling motors 12 and 13 by the control unit 16, especially, control of the traveling motors 12 and 13 in the low-velocity range, will be hereinafter explained.

Control of Traveling Motor

Figure 5:
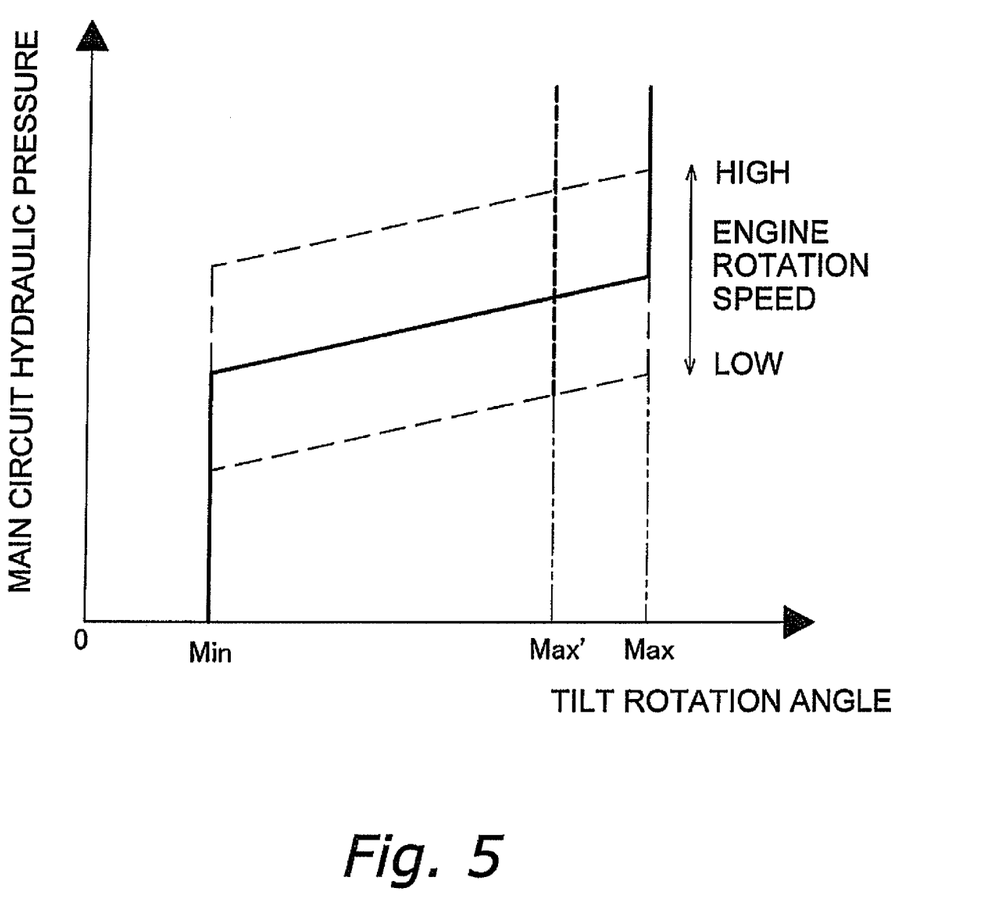
FIG. 5 is a chart for illustrating relation among tilt rotation angle, main circuit hydraulic pressure, and rotation speed of an engine.

The control unit 16 processes output signals from the engine rotation speed detection unit 19 and the main circuit hydraulic pressure detection unit 22, and outputs a command for changing the tilt rotation angle to the traveling motors 12 and 13. FIG. 5 illustrates the relations among tilt rotation angle, main circuit hydraulic pressure, and rotation speed of the engine. A solid line in FIG. 5 is a line that defines the tilt rotation angle with respect to the main circuit hydraulic pressure in predetermined rotation speed of the engine. The tilt rotation angle is minimum (Min) when the main circuit hydraulic pressure is less than or equal to the predetermined value, and then the tilt rotation angle gradually increases (sloped portion of the solid line) as the main circuit hydraulic pressure increase. After the tilt rotation angle becomes maximum (Max), the tilt rotation angle maintains the maximum tilt rotation angle Max even when the hydraulic pressure increases.

The sloped portion of the solid line is configured to fluctuate depending on the rotation speed of the engine. In other words, when the rotation speed of the engine is low, the tilt rotation angle is controlled to become large from a state that the main circuit hydraulic pressure is lower, and is controlled to be maximum in a state that the main circuit hydraulic pressure is lower (see a sloped portion of a lower dotted line in FIG. 5). On the other hand, when the rotation speed of the engine is high, the tilt rotation angle is maintained to be the minimum tilt rotation angle Min until the main circuit hydraulic pressure becomes higher, and is controlled to reach the maximum tilt rotation angle Max in a state that the main hydraulic pressure is higher (see a sloped portion of an upper dotted line in FIG. 5).

Figure 3:
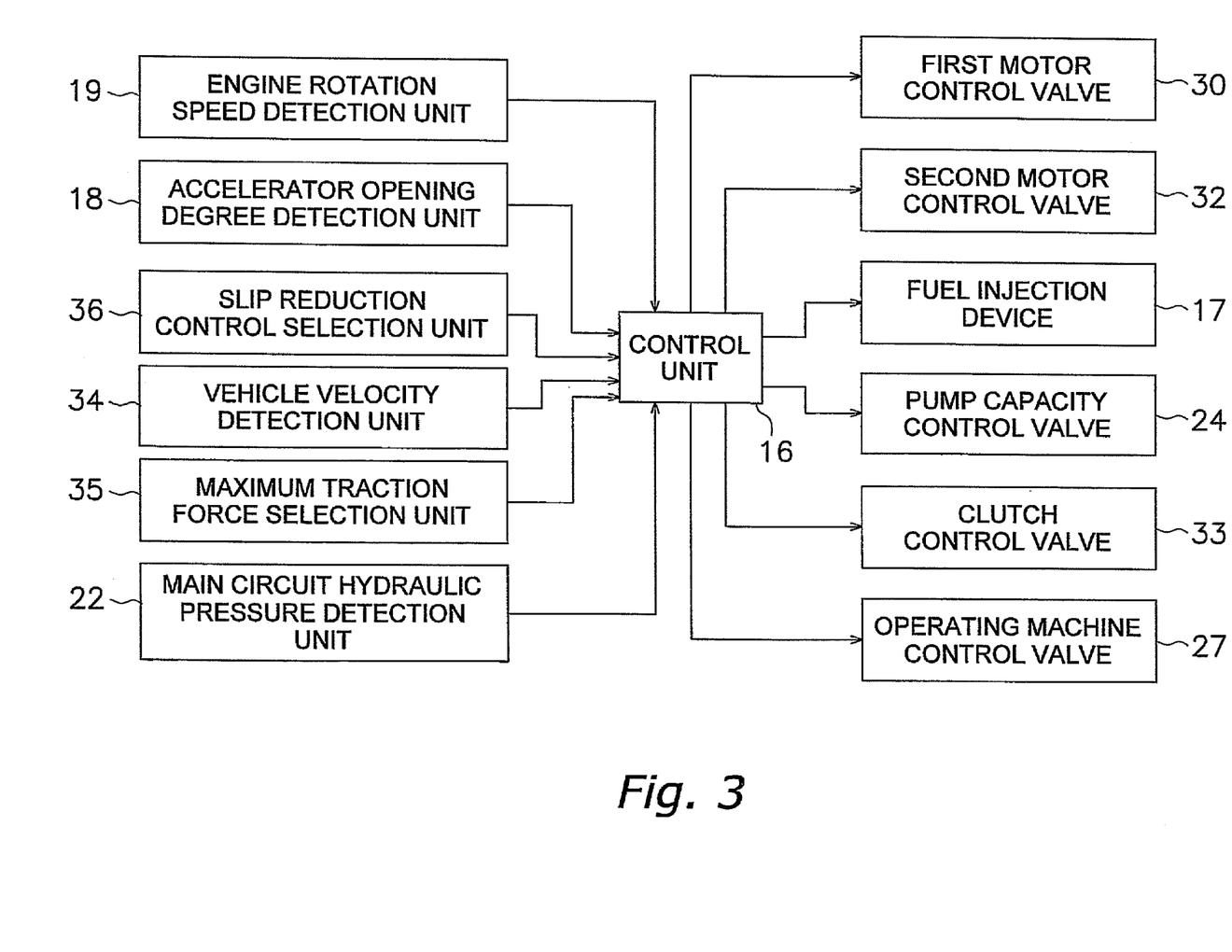
FIG. 3 is a block diagram of a construction vehicle.

Here, this construction vehicle 1 includes a maximum traction force selection unit 35 (see FIG. 3). It is possible to change the maximum traction force by operating the maximum traction force selection unit 35. The maximum traction force selection unit 35 is a switch provided in the operator cab 5. The control unit 16 switches the maximum value of the tilt rotation angle of the second traveling motor 13 based on an output signal from the maximum traction force selection unit 35, and the maximum traction force is changed thereby. In this construction vehicle 1, the maximum traction force selection unit 35 is allowed to be switched between two stages, that is, an on-state and an off-state. When the maximum traction force selection unit 35 is in the off-state, the maximum tilt rotation angle is positioned in the Max position in FIG. 5. In this condition, the vehicle velocity-traction force property is illustrated by a chart L1 in FIG. 4. Then, when the maximum traction force selection unit 35 is set to be in the on-state, the maximum tilt rotation angle is changed from Max in FIG. 5 to Max'. Thus, when the maximum tilt rotation angle is changed to Max' that is smaller than Max, the vehicle velocity-traction force property in which the maximum traction force is reduced as illustrated in a chart L2 in FIG. 4 is achieved. Note that the charts L1 and L2 are the vehicle velocity-traction force property when the accelerator opening degree is in the fully-opened state. Accordingly, even if the accelerator opening degree is set to be maximum for ensuring the operation amount performed by the operating machine 3 on the low-friction road such as the soft road and the road covered with snow, the driving force of the tires 4a and 4b is inhibited. Thus, it is possible to prevent occurrence of slip. Note the maximum traction force may be changed not in the two stages but in a plurality of stages greater than or equal to three stages, and may be continuously changed.

Slip Reduction Control

This construction vehicle 1 includes a slip reduction control selection unit 36, and an operator is allowed to perform a slip reduction control by manipulating the slip reduction control selection unit 36. The slip reduction control is control under which slip is further prevented from occurring by changing the maximum rotation speed of the engine depending on the vehicle velocity. The slip reduction control selection unit 36 is a switch provided in the operator cab 5, and is configured to be switched between an on-state and an off-state. When the slip reduction control selection unit 36 is in the off-state, the slip reduction control is allowed to be performed. On the other hand, when the slip reduction control selection unit 36 is in the off-state, the slip reduction control is prevented from being performed. The slip reduction control will be hereinafter explained with reference to a flowchart in FIG. 6.

Figure 6:
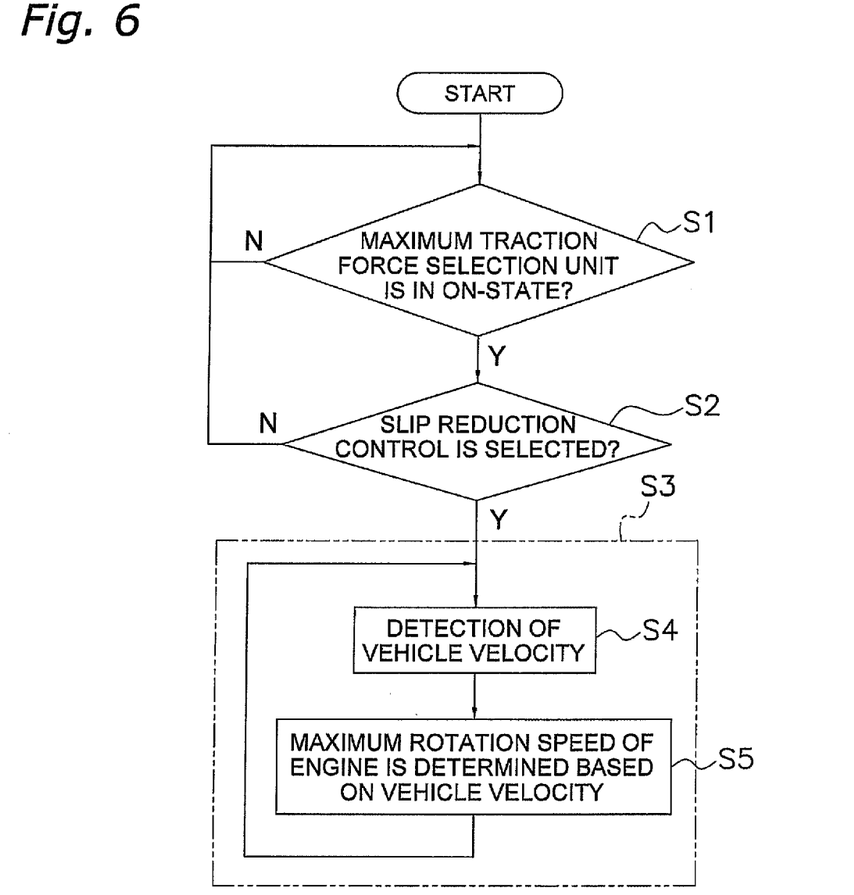
FIG. 6 is a flowchart of slip reduction control.

First, it is judged in a first step S1 whether the maximum traction force selection unit 35 is in the on-state. If the maximum traction force selection unit 35 is in the on-state, it is judged in a second step S2 whether the slip reduction control is selected. Here, the slip reduction control is judged to be selected when the slip reduction control selection unit 36 is in the on-state. Subsequently, the slip reduction control is performed in a third step S3. In other words, when the maximum traction force selection unit 35 and the slip reduction control selection unit 36 are both in the on-state, the slip reduction control is performed.

Figure 7:
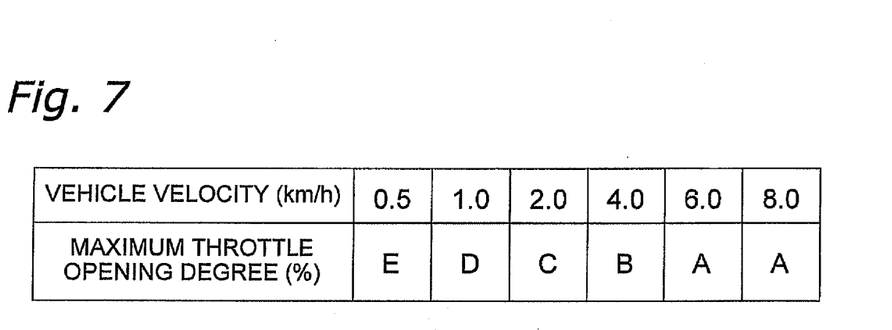
FIG. 7 is a table for illustrating the maximum rotation speed of an engine with respect to the vehicle velocity.
Figure 8:
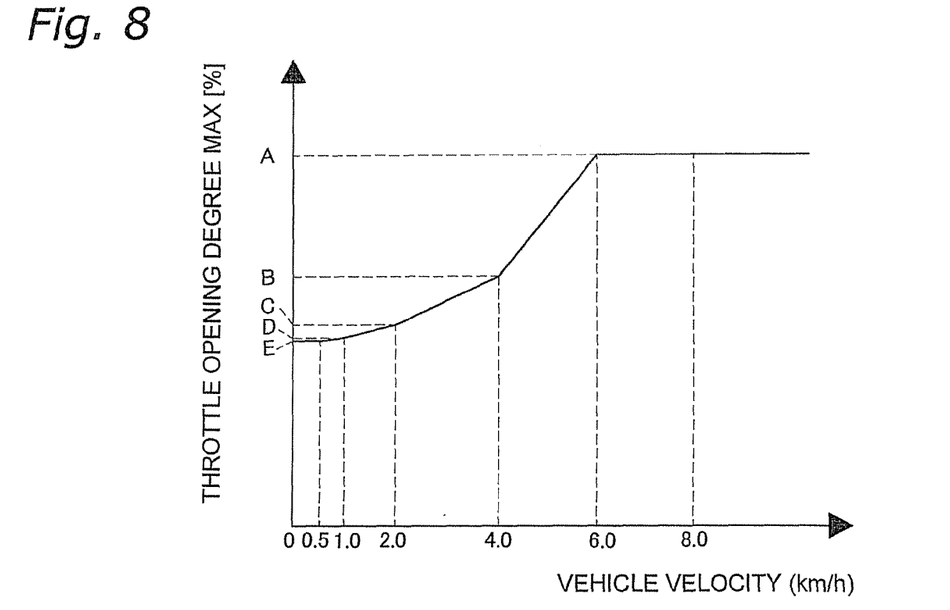
FIG. 8 is a chart for illustrating the maximum rotation speed of an engine with respect to the vehicle velocity.

Under the slip reduction control, the vehicle velocity is detected in a fourth step S4. Next, the maximum rotation speed of the engine is determined based on the detected vehicle velocity in a fifth step S5. Here, the control unit 16 determines the maximum rotation speed of the engine based on a table in FIG. 7 and a chart in FIG. 8. The table and the chart serve for setting the maximum throttle opening degree with respect to the vehicle velocity, and the following relation is satisfied: E<D<C<B<A. In other words, in the table and the chart, the maximum throttle opening degree becomes small as the vehicle velocity becomes slow in a low-velocity range in which the vehicle velocity is less than or equal to predetermined velocity (specifically, 6.0 km/h). The control unit 16 restricts the maximum rotation speed of the engine by restricting the maximum throttle opening degree based on the table and the chart. Accordingly, as illustrated in a chart L4 in FIG. 4, the control unit 16 is allowed to control the maximum rotation speed of the engine so that the vehicle velocity-traction force property in the low-velocity range is approximated to the vehicle velocity-traction force (see a chart L3) of a vehicle that a torque converter is installed therein. The vehicle velocity-traction force property of the vehicle that a torque converter is installed therein is a monotonically decreasing function, and the maximum traction force therein will be the maximum value when the velocity is zero. In the vehicle velocity-traction force property (see a chart L4) that is achieved under the slip reduction control, the maximum traction force is generated at a velocity that is slower than the velocity at which the maximum traction force in the vehicle velocity-traction force property illustrated in the chart L2 is generated. The chart L2 indicates the vehicle velocity-traction force property (accelerator opening degree is 100%) when the maximum rotation speed of the engine is set to be constant even in the low-velocity range without performing the slip reduction control, and the maximum traction force selection unit 35 is herein set to be in the on-state. In other words, the vehicle velocity V1 at which the maximum traction force is generated in the vehicle velocity-traction force property when the slip reduction control is performed is slower than the vehicle velocity V2 at which the maximum traction force is generated in the vehicle velocity-traction force property when the slip reduction control is not performed. For example, the vehicle velocity V1 is 1 km/h. Note that restriction of the maximum rotation speed of the engine under the slip reduction control is performed when the main circuit hydraulic pressure is greater than or equal to the pressure at which the tilt rotation angle of the second traveling motor 13 becomes the maximum tilt rotation angle. This is performed when the vehicle velocity is slower than the vehicle velocity V3 in a case of FIG. 4.

Note that the control unit 16 stop performing the slip reduction control when the maximum traction selection unit 35 or the slip reduction control selection unit 36 is set to be in the off-state.

(1) In this construction vehicle 1, the maximum rotation speed of the engine is controlled under the slip reduction control. Accordingly, it is possible to achieve the vehicle velocity-traction force property that is approximated to the vehicle velocity-traction force property of a vehicle that a torque converter is installed therein. With the vehicle velocity-traction force property, it is possible to prevent slip from easily occurring even during an operation on the low-friction road. Operational efficiency will be enhanced in an operation such as a snow removal operation, an operation in a livestock site, and an operation on the sandy ground. In addition, it is possible to prevent the tires 4a and 4b from slipping without concerning the accelerator operation.

(2) In this construction vehicle 1, it is possible to arbitrary select to performance or non-performance of the slip reduction control by the slip reduction control selection unit 36. Therefore, it is possible to perform the slip reduction control as necessary. For example, the slip reduction control is prevented from performed during traveling on the road with the normal condition, and is also allowed to be performed during an operation on the road covered with snow.

(3) In the construction vehicle 1, restriction of the maximum rotation speed of the engine under the slip reduction control is performed when the main circuit hydraulic pressure is greater than or equal to the pressure at which the tilt rotation angle of the second traveling motor 13 is the maximum tilt rotation angle. Therefore, when the main circuit hydraulic pressure is lower than the pressure at which the tilt rotation angle of the traveling hydraulic motor becomes the maximum tilt rotation angle, the slip reduction control is not performed, and thus it is possible to achieve good traveling performance of the traveling hydraulic motor.

OTHER EMBODIMENTS (A) In the above described embodiment, the maximum rotation speed of the engine under the slip reduction control becomes small as the vehicle velocity becomes slow. However, the maximum rotation speed of the engine is not necessarily limited to this as long as it is possible to achieve the vehicle velocity-traction force property that is approximated to the vehicle velocity-traction force property of a vehicle that a torque converter is installed therein.

(B) In the above described embodiment, the maximum rotation speed of the engine is determined based on the vehicle velocity. However, it may be determined based on the main circuit hydraulic pressure. For example, a table, such as the table illustrate in FIG. 7, may be prepared with respect to each predetermined range of the main circuit hydraulic pressure.

In addition, the maximum rotation speed of the engine may be determined based not on the vehicle speed but on the rotation speed of the driving shaft 15.

Furthermore, when the maximum traction force to be selected by the maximum traction force selection unit 35 is allowed to be set in stages greater than or equal to three stages, the maximum rotation speed of the engine may be determined depending on the vehicle velocity and the magnitude of the maximum traction force to be selected.

(C) In the above described embodiment, the slip reduction control is performed when the maximum traction force selection unit 35 is in the on-state and the maximum traction force is set to be low. However, the slip reduction control may be performed when the maximum traction force selection unit 35 is in the off-state.

Also, the vehicle velocity-traction force property, which is approximated to the vehicle velocity-traction force property at the first-gear velocity of a vehicle that a torque converter is installed therein, may be configured to be achieved in a case that the slip reduction control is performed when the maximum traction force selection unit 35 is in the off-state. In addition, the vehicle velocity-traction force property, which is approximated to the vehicle velocity-traction force property at the second-gear velocity of a vehicle that a torque converter is installed therein, may be configured to be achieved in a case that the slip reduction control is performed when the maximum traction force selection unit 35 is in the on-state.

(D) In the above described embodiment, the present invention is applied to the wheel loader. However, the present invention may be applied to not only the wheel loader but also a construction vehicle that travels by the hydraulic motor. In addition, the construction vehicle is not limited to the construction vehicle 1 of the above described embodiment that travels by the two hydraulic motors, and may be a vehicle that travels by one hydraulic motor, for instance.

(E) In the above described embodiment, restriction of the maximum rotation speed of the engine under the slip reduction control is performed when the main circuit hydraulic pressure is greater than or equal to the pressure at which the tilt rotation angle of the second traveling motor 13 is the maximum tilt rotation angle. However, it may be performed when the main circuit hydraulic pressure is the pressure excluding the above described pressure.

The present invention has an effect that occurrence of slip is reduced, and is useful as a construction vehicle.

The invention claimed is:

1. A construction vehicle comprising:
an engine;
a hydraulic pump configured to be driven by the engine;
a traveling hydraulic motor configured to be driven by pressured oil discharged by the hydraulic pump;
a traveling wheel configured to be driven by driving force of the traveling hydraulic motor;
a control unit configured to control a vehicle velocity and a traction force by controlling rotation speed of the engine, capacity of the hydraulic pump, and capacity of the traveling hydraulic motor; and
a vehicle velocity detection unit configured to detect the vehicle velocity,
the control unit being further configured to perform slip reduction control for reducing maximum rotation speed of the engine as the vehicle velocity becomes slow in a low-velocity range in which the vehicle velocity is less than or equal to a predetermined velocity,
the control unit being configured to control the maximum rotation speed of the engine under the slip reduction control to obtain a vehicle velocity-traction force property in which a maximum traction force is generated at a first velocity slower than a second velocity at which the maximum traction force is generated when the slip reduction control is not performed.

2. The construction vehicle of claim 1, further comprising a slip reduction control selection unit configured to receive an operator input to activate the slip reduction control.

3. A construction vehicle comprising:
an engine;
a hydraulic pump configured to be driven by the engine;
a traveling hydraulic motor configured to be driven by pressured oil discharged by the hydraulic pump;
a traveling wheel configured to be driven by driving force of the traveling hydraulic motor; and
a control unit configured to control a vehicle velocity and a traction force by controlling rotation speed of the engine, capacity of the hydraulic pump, and capacity of the traveling hydraulic motor,
the control unit being further configured to perform slip reduction control for controlling maximum rotation speed of the engine such that a vehicle velocity-traction force property is approximated to a vehicle velocity-traction force property of a vehicle having a torque converter.

4. The construction vehicle of claim 2, wherein
the control unit is configured to control the maximum rotation speed of the engine under the slip reduction control such that the vehicle velocity-traction force property is approximated to a monotonically decreasing function.

5. The construction vehicle of claim 2, further Comprising a vehicle velocity detection unit configured to detect the vehicle velocity,
the control unit being configured to determine the maximum rotation speed of the engine based on the vehicle velocity detected under the slip reduction control.

6. The construction vehicle of claim 5, wherein
the control unit is configured to reduce the maximum rotation speed of the engine as the vehicle velocity becomes slow under the slip reduction control.

7. The construction vehicle of claim 3, wherein
the control unit is further configured to perform the slip reduction control such that the vehicle velocity-traction force property is approximated to the vehicle velocity-traction force property of the vehicle having the torque converter in which a maximum traction force is generated when the vehicle velocity is equal to zero.

8. The construction vehicle of claim 3, wherein
the control unit is configured to control the maximum rotation speed of the engine under the slip reduction control to obtain the vehicle velocity-traction force property in which a maximum traction force is generated at a first velocity slower than a second velocity at which the maximum traction force is generated when the slip reduction control is not performed.

9. The construction vehicle of claim 3, further comprising
a slip reduction control selection unit configured to receive an operator input to activate the slip reduction control.

* * * * *